United States Patent
Miyagi

(10) Patent No.: US 11,843,660 B2
(45) Date of Patent: Dec. 12, 2023

(54) TRANSFER CONTROL DEVICE, TRANSFER CONTROL METHOD, SERVICE PROVISION SYSTEM, AND TRANSFER CONTROL PROGRAM

(71) Applicant: Nippon Telegraph and Telephone Corporation, Tokyo (JP)

(72) Inventor: Yasutoshi Miyagi, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 17/057,976

(22) PCT Filed: May 8, 2019

(86) PCT No.: PCT/JP2019/018410
§ 371 (c)(1),
(2) Date: Nov. 23, 2020

(87) PCT Pub. No.: WO2019/230315
PCT Pub. Date: Dec. 5, 2019

(65) Prior Publication Data
US 2021/0203719 A1    Jul. 1, 2021

(30) Foreign Application Priority Data
May 28, 2018 (JP) ................. 2018-101304

(51) Int. Cl.
*H04L 12/743* (2013.01)
*H04L 29/08* (2006.01)
(Continued)

(52) U.S. Cl.
CPC .......... *H04L 67/1008* (2013.01); *G06F 9/505* (2013.01); *G06F 9/5055* (2013.01);
(Continued)

(58) Field of Classification Search
CPC ....... H04L 67/1008; H04L 43/16; H04L 1/22; H04L 49/55; H04L 12/00; H04L 41/0668;
(Continued)

(56) References Cited

U.S. PATENT DOCUMENTS 10,481,794 B1* 11/2019 Castelli ................. G06F 3/0653
2005/0066014 A1* 3/2005 Willehadson ........... G06F 9/505
709/220
(Continued)

FOREIGN PATENT DOCUMENTS

JP  2004-171495  6/2004
JP  2005-518016  6/2005

OTHER PUBLICATIONS

Fujitsu.com, [online], "Introduction to Load Balancing," Aug. 3, 2004, retrieved on Jan. 11, 2017, retrieved from URL<http://www.fujitsu.com/jp/products/network/security-bandwidth-control-load-balancer/ipcom/material/data/1/2.html>, 14 pages (with English Translation).
(Continued)

*Primary Examiner* — Younes Naji
*Assistant Examiner* — Da T Ton
(74) *Attorney, Agent, or Firm* — Fish & Richardson P.C.

(57) ABSTRACT

To provide a transfer control apparatus, a transfer control method, and a transfer control program, by which it is possible to improve availability without modifying an application side. The transfer control apparatus 1 is an apparatus for dynamically switching enablers 2, and includes a registration unit 11 that registers enablers 2 having a similar function, in an identical genre, a monitoring unit 12 that monitors states of the enablers 2, and a transfer control unit 13 that transfers a request to an alternative enabler 2 registered in a genre identical to each of the enablers 2 to
(Continued)

automatically switch a request destination if the enabler 2 is in a predetermined busy state upon calling the enabler 2.

11 Claims, 15 Drawing Sheets

(51) Int. Cl.

| | |
|---|---|
| H04L 67/1008 | (2022.01) |
| H04L 45/7453 | (2022.01) |
| G06F 11/00 | (2006.01) |
| H04L 43/16 | (2022.01) |
| G06F 11/30 | (2006.01) |
| H04L 1/22 | (2006.01) |
| H04L 49/55 | (2022.01) |
| H04L 12/00 | (2006.01) |
| H04L 41/0668 | (2022.01) |
| H04L 49/50 | (2022.01) |
| H04L 43/0805 | (2022.01) |
| G06F 11/34 | (2006.01) |
| G06F 9/50 | (2006.01) |

(52) U.S. Cl.
CPC .......... *G06F 11/004* (2013.01); *G06F 11/008* (2013.01); *G06F 11/30* (2013.01); *G06F 11/3433* (2013.01); *H04L 1/22* (2013.01); *H04L 12/00* (2013.01); *H04L 41/0668* (2013.01); *H04L 43/0805* (2013.01); *H04L 43/16* (2013.01); *H04L 45/7453* (2013.01); *H04L 49/50* (2013.01); *H04L 49/55* (2013.01)

(58) Field of Classification Search
CPC . H04L 49/50; H04L 43/0805; H04L 45/7453; H04L 47/125; G06F 9/505; G06F 9/5055; G06F 11/3433; G06F 11/008; G06F 11/004; G06F 11/30; G06F 13/00; G06F 9/54
USPC ................. 709/201, 203, 223–229, 238–240
See application file for complete search history.

(56) References Cited

U.S. PATENT DOCUMENTS

| | | | |
|---|---|---|---|
| 2010/0011374 A1* | 1/2010 | Cho ........................ | G06F 9/546 709/206 |
| 2012/0159102 A1* | 6/2012 | Kan ..................... | H04L 67/1065 711/E12.103 |
| 2017/0214627 A1* | 7/2017 | Zhang ................. | H04L 67/1023 |
| 2021/0235244 A1* | 7/2021 | Bartolomé Rodrigo ..................... | H04W 8/18 |

OTHER PUBLICATIONS

Matsuura et al., "A Study of Compatible Way for APIs," Institute of Electronics, Information and Communication Engineers (IEICE), 2015, 114(477):517-522, 15 pages (with English Translation).

Takahashi et al., "Aiming to Revitalize the B2B2X Business Model," NTT Technical Journal, Oct. 2015, pp. 56-58, 7 pages (with English Translation).

* cited by examiner

| API NAME | | GoogleTranslate | YandexTranslate API | IBMWatsonLanguageTranslator |
|---|---|---|---|---|
| METHOD | TRANSLATION | GoogleTranslate.translate Translate `string` from `sourceLanguage` to `targetLanguage` | YandexTranslate.translate Translates text to the specified language. | IBMWatsonLanguageTranslator.translate Translates input text from the source language to the target language. |
| | DETECT LANGUAGE | GoogleTranslate.detectLanguage Detect language of `string` | YandexTranslate.detectLanguage Detects the language of the specified text. | IBMWatsonLanguageTranslator.getIdentifiableLanguages Return the list of languages it can detect. |
| | OTHER | GoogleTranslate.translateAutomatic Translate `string` from `sourceLanguage` to target language automatically | YandexTranslate.getSupportedLanguages Gets a list of translation directions supported by the service. | OTHER 6 APIs |

Fig. 9

TRANSFER CONTROL DEVICE, TRANSFER CONTROL METHOD, SERVICE PROVISION SYSTEM, AND TRANSFER CONTROL PROGRAM

CROSS-REFERENCE TO RELATED APPLICATIONS

This application is a National Stage application under 35 U.S.C. § 371 of International Application No. PCT/JP2019/018410, having an International Filing Date of May 8, 2019, which claims priority to Japanese Application Serial No. 2018-101304, filed on May 28, 2018. The disclosure of the prior application is considered part of the disclosure of this application, and is incorporated in its entirety into this application.

TECHNICAL FIELD

The present invention relates to a transfer control apparatus, a transfer control method, a service providing system, and a transfer control program.

BACKGROUND ART

In a recent B2B2X business model, the left side B, which is a service providing system, provides components used in an application to the center B, which is an application providing server. The service providing server provides an API-GW function and a load balancer function (see NPL1 and NPL2).

In the application programming interface-gateway (API-GW) function, it is possible to connect to a plurality of enablers (component providing servers) through an API, collect responses from the plurality of enablers, and return the responses to the application providing server. In the load balancer function, a load status of a plurality of servers, the number of requests, a response time, and the like are monitored to realize a server load distribution.

CITATION LIST

Non Patent Literature

NPL1: Mayumi Takahashi, Utilization of APIs for B2B2X Business Model, NTT GIJUTU Journal, October 2015, pp. 56-58

NPL2: Fujitsu, "Introduction to Load Balancing, Part 2, Basic Functions of Load Balancing Device", [online], Aug. 3, 2004, [searched on Feb. 13, 2017], Internet <URL: http://www.fujitsu.com/jp/products/network/security-bandwidth-control-load-balancer/ipcom/material/data/1/2.html>

SUMMARY OF THE INVENTION

Technical Problem

However, in an application cooperating with a plurality of external services, availability (load, response, and the like) is different for each enabler, so that an application that includes a loaded enabler has a poor response, and thus the overall application availability is low. If a service of an enabler is suspended or the specifications thereof are changed, it is not possible to normally use the application until a modification is performed at the application side.

An object of the present invention is to provide a transfer control apparatus, a transfer control method, a service providing system, and a transfer control program, by which it is possible to improve availability without modifying an application side.

Means for Solving the Problem

In order to achieve the above object, according to a first aspect of the present invention, a transfer control apparatus for dynamically switching an enabler is provided. The transfer control apparatus includes a registration unit that registers enablers having a similar function, in an identical genre, a monitoring unit that monitors states of the enablers, and a transfer control unit that transfers a request to an alternative enabler registered in a genre identical to each of the enablers to automatically switch a request destination if the enabler is in a predetermined busy state upon calling the enabler.

According to a second aspect of the present invention based on the first aspect, when the enabler is registered, a method common to APIs in an identical genre is set as a target API to be converted, and the method is converted when the request is transferred to the alternative enabler.

According to a third aspect of the present invention based on the second aspect, when the enabler is registered, a method common to APIs in an identical genre is set as a genre calling API, and the method is converted by a wrapper at each calling.

According to a fourth aspect of the present invention, a transfer control method for dynamically switching an enabler is provided. The method includes using a computer to execute registering enablers having a similar function, in an identical genre, monitoring states of the enablers, and transferring a request to an alternative enabler registered in a genre identical to each of the enablers to automatically switch a request destination if the enabler is in a predetermined busy state upon calling the enabler.

According to a fifth aspect of the present invention, a transfer control program causes a computer to function as a functional unit according to any one of the first to third aspects.

Effects of the Invention

According to the present invention, it is possible to provide a transfer control apparatus, a transfer control method, a service providing system, and a transfer control program, by which it is possible to improve availability without modifying an application side.

BRIEF DESCRIPTION OF DRAWINGS

FIG. 9 is a table showing a comparison of APIs in the identical genre.

DESCRIPTION OF EMBODIMENTS

Hereinafter, embodiments of the present invention will be described with reference to the drawings. In the following description regarding the drawings, the same or similar reference signs will be provided to the same or similar components.

Figure 1:
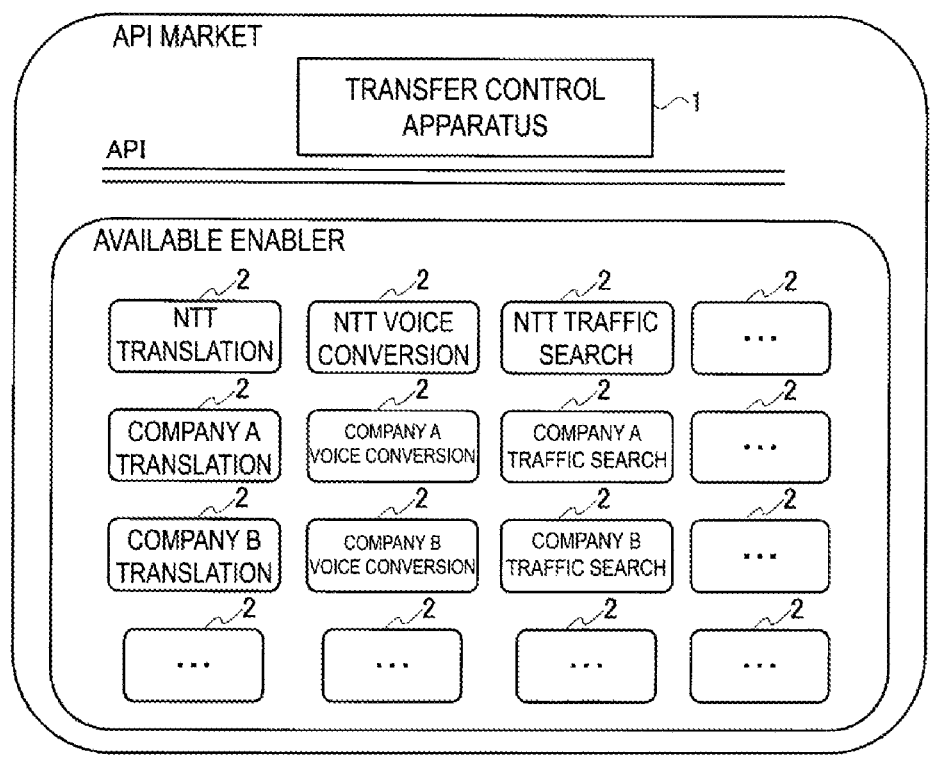
FIG. 1 is a diagram for explaining an API market.

FIG. 1 is a diagram for explaining an API market. Here, a case is assumed in which an API market (API platform) where public APIs of the entire NTT Group and popular APIs of other companies are prepared is provided. In such a case, an enabler 2 of a service of another company, such as "translation of company A" or "translation of company B" is used, and thus, there is a risk that the service of the other company is suspended or ends. Thus, it is assumed that without depending on one enabler 2, a plurality of enablers 2 having a similar function are registered on the same platform.

However, availability (a load, a response, and the like) differs for each enabler 2. Thus, a response of an application 5 (enabler cooperation application) including a loaded enabler 2 deteriorates, and thus, the availability decreases as a whole. Further, if an enabler 2 of a service of another company is used to create the application 5, there is a risk that the service of the other company is suspended or ends. Moreover, if the service of the enabler 2 is suspended or the specifications thereof are changed, it is not possible to normally use the application 5 until a modification is performed at the application 5 side.

Figure 2:
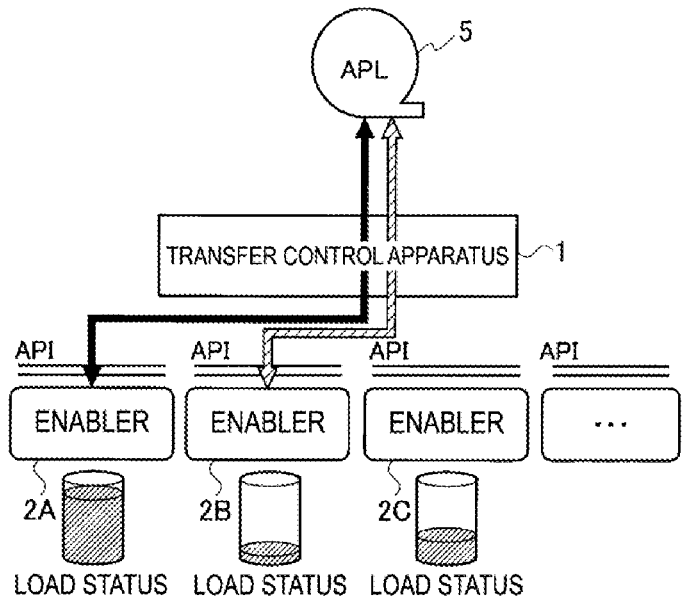
FIG. 2 is a diagram for explaining a case where a trouble occurs in an enabler.

FIG. 2 illustrates a case where an enabler 2A has a slow response due to a trouble (load and the like). It is assumed that an enabler 2B responds normally. In such a case, processing of the enabler 2A is not completed, and thus, no response is returned as the application 5.

Figure 3:
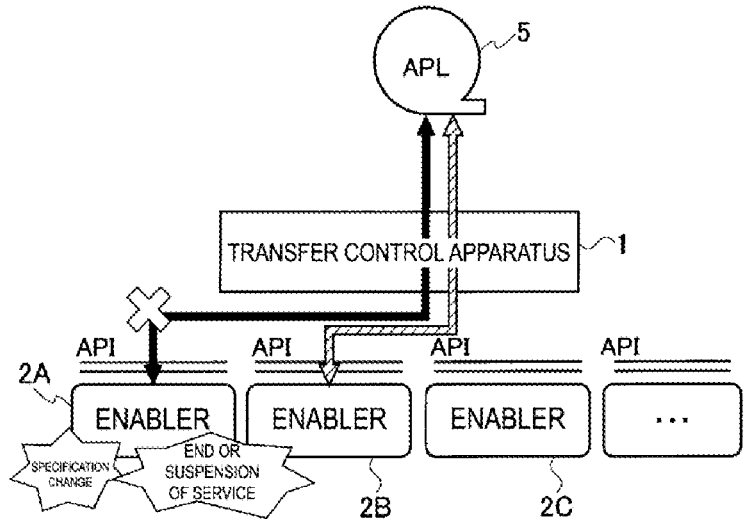
FIG. 3 is a diagram for explaining a case where a specification change and the like occur in the enabler.

In FIG. 3, a case is assumed where the specifications of the enabler 2A are changed or the service ends or is suspended. It is assumed that the enabler 2B responds normally. In such a case, if a request is sent to the enabler 2A without modifying the application 5, an error occurs due to the specification change of the enabler 2A or the end or the suspension of the service.

Overview of Embodiment of the Present Invention

In the embodiment of the present invention, a transfer control apparatus 1 grasps a state of each of the enablers 2, if a response is delayed compared to a normal time or an error occurs frequently, a request is transferred to an alternative enabler 2 in the identical genre and the alternative enabler 2 sends back a response on behalf of the enabler 2. Further, the transfer control apparatus 1 registers a genre of the enabler 2 when the enabler 2 is registered, and, when a request is transferred to the alternative enabler 2, converts a method between the enablers 2 in the identical genre.

This makes it possible to increase the availability of the application 5 cooperating with a plurality of enablers 2. Further, the application 5 side cooperating with the plurality of enablers 2 does not need to execute processing where the load status of the enablers 2 is taken into consideration, and does not need to be modified if the enablers 2 suspend or the specifications thereof change. Thus, it is possible for a creator of the application 5 to reduce man-hours and a mounting time.

Application Providing System

Figure 4:
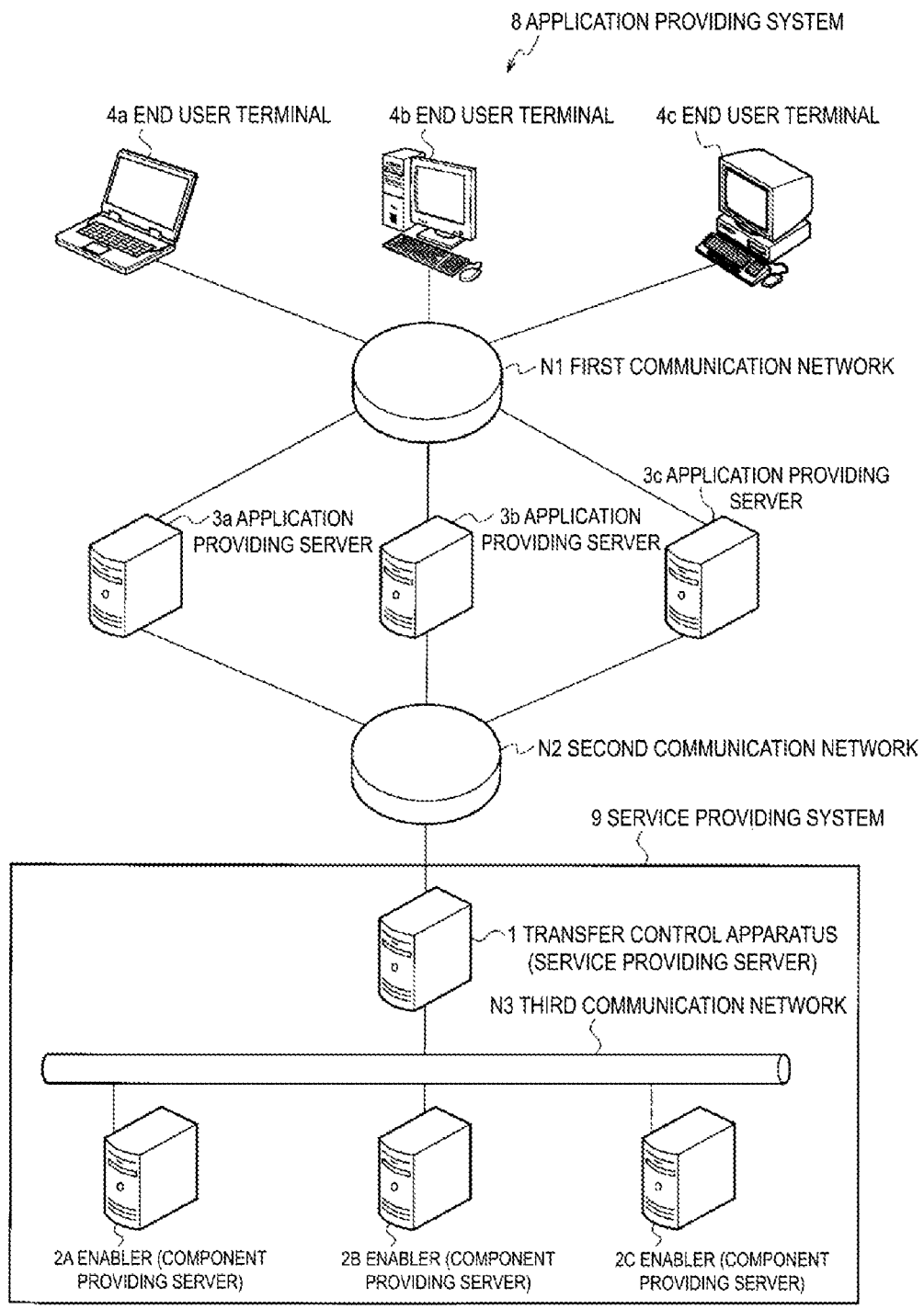
FIG. 4 is a configuration diagram illustrating an application example of a transfer control apparatus according to an embodiment of the present invention.

FIG. 4 is a configuration diagram illustrating an application example of the transfer control apparatus 1 according to the embodiment of the present invention. As illustrated in the diagram, an application providing system 8 includes a service providing system 9 including the transfer control apparatus (service providing server) 1, application providing servers 3a, 3b, and 3c, and end user terminals 4a, 4b, and 4c. If the application providing servers 3a, 3b, and 3c are not distinguished, the application providing servers 3a, 3b, and 3c may be simply described as "application providing server 3". If the end user terminals 4a, 4b, and 4c are not distinguished, the end user terminals 4a, 4b, and 4c may be simply described as "end user terminal 4".

The end user terminal 4 and the application providing server 3 are communicably connected to each other via a first communication network N1. The application providing server 3 and the transfer control apparatus 1 are communicably connected to each other via a second communication network N2. The first communication network N1 and the second communication network N2, which are described as different communication networks in FIG. 4, may be the same communication network such as the Internet.

The application providing system 8 is a system for realizing a B2B2X business model. The service providing system 9 corresponds to B on the left side of B2B2X, and the application providing server 3 corresponds to B at the center of B2B2X. In the example illustrated in FIG. 4, a case is described where X on the right side of B2B2X is the end user terminal 4, that is, C (Consumer); however, X may be a system of a company and the like.

The application providing server 3 provides a function to the end user terminal 4, based on data provided from the service providing system 9.

The service providing system 9 includes the transfer control apparatus 1, and enablers (component providing servers) 2A, 2B, and 2C that provides components used in the application 5 provided in the application providing server 3. The transfer control apparatus 1 and the enablers 2A, 2B, and 2C are communicably connected to each other via a third communication network N3. The third communication network N3 is typically a local area network (LAN). If the enablers 2A, 2B, and 2C are not distinguished, the enablers 2A, 2B, and 2C may be simply described as "enabler 2".

Upon receiving a request from the application providing server 3 via an API, the transfer control apparatus 1 sends the request to the enabler 2 via the API. Thus, if the transfer control apparatus 1 receives the response from the enabler 2, the transfer control apparatus 1 generates a response to the application providing server 3, based on the received response, and returns the generated response to the application providing server 3.

Transfer Control Apparatus

Figure 5:
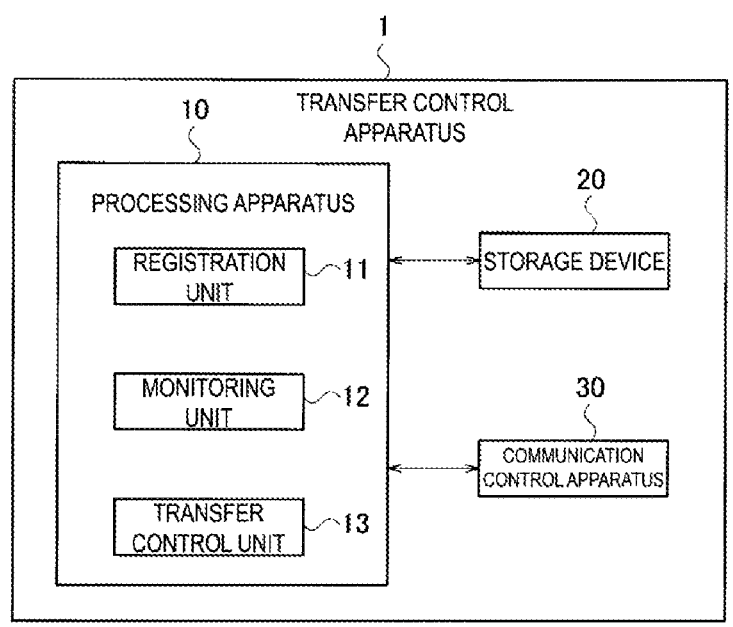
FIG. 5 is a functional block diagram illustrating a configuration of e transfer control apparatus according to the embodiment of the present invention.

FIG. 5 is a functional block diagram illustrating a configuration of the transfer control apparatus 1 according to the embodiment of the present invention. The transfer control apparatus 1 is a computer having a request destination switching function in order to monitor a load status and an operation status of the enabler 2 to improve the availability if the load is high or the service is suspended. The transfer control apparatus 1 includes a processing device 10, a storage device 20, and a communication control device 30. Of course, the transfer control apparatus 1 also includes various functions in a general transfer control apparatus (service providing server) 1; however, the various functions are not illustrated here.

The processing device 10 includes a registration unit 11 that registers the enabler 2, a monitoring unit 12 that monitors a load status, an operation status, and the like of the enabler 2, and a transfer control unit 13 that controls a transfer of a request. The storage device 20 is a device that stores therein various types of information. The communication control device 30 is a device that communicates with another device via the second communication network N2, the third communication network N3, and the like.

According to such a transfer control apparatus 1, it is possible to switch from an original enabler 2 to an alternative enabler 2 in the identical genre, according to a load status, an operation status, and the like of the enabler 2, so that it is possible to operate the application 5 without a need of suspending the service. As a result, in the present embodiment, it is possible to improve the availability without modifying the enablers 2 and the application 5 if loads of some of the enablers 2 increase in the application 5 cooperating with the enabler and if the service is suspended.

Transfer Control Method

Figure 6:
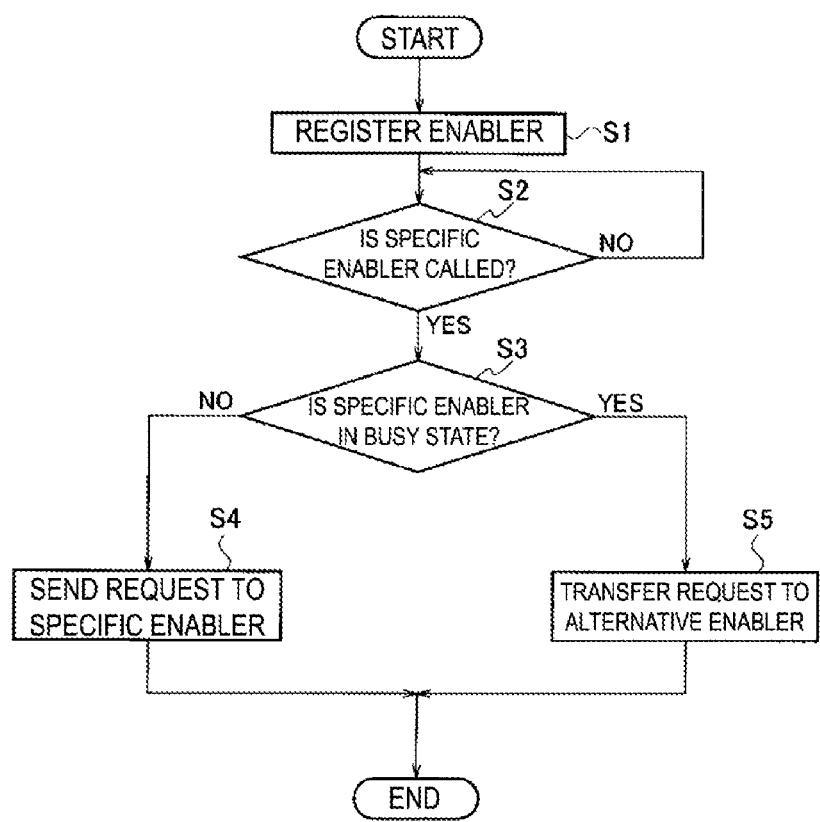
FIG. 6 is a flowchart illustrating an operation of the transfer control apparatus according to the embodiment of the present invention.

FIG. 6 is a flowchart illustrating an operation of the transfer control apparatus 1 according to the embodiment of the present invention. A transfer control method according to the embodiment of the present invention will be described below with reference to FIG. 6.

The transfer control apparatus 1 firstly registers enablers 2 having a similar function, in an identical genre (step S1), and upon calling a specific enabler 2, determines whether the specific enabler 2 is in a predetermined busy state (step S2→step S3). The predetermined busy state is a case where the load is high or an error is frequently returned. The case where the error is frequently returned corresponds to a case where the specification of the enabler 2 is changed or a case where the service ends or is suspended. Here, if the specific enabler 2 is not in the predetermined busy state, a request is sent to the specific enabler 2 (step S3→step S4). On the other hand, if the specific enabler 2 is in the predetermined busy state, the request is transferred to an alternative enabler 2 registered in the identical genre to the specific enabler 2, and thus, a request destination is automatically switched (step S3→step S5).

Configuration of API-GW and Enabler

Figure 7:
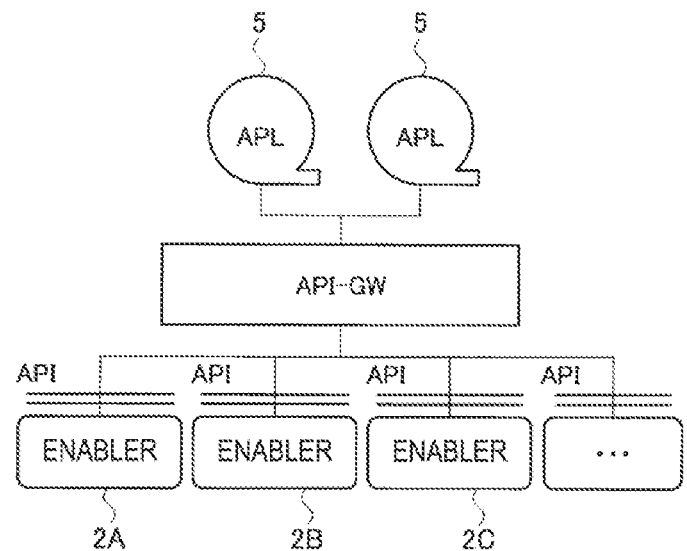
FIG. 7 is a diagram of a configuration assumed in the embodiment of the present invention.
Figure 8:
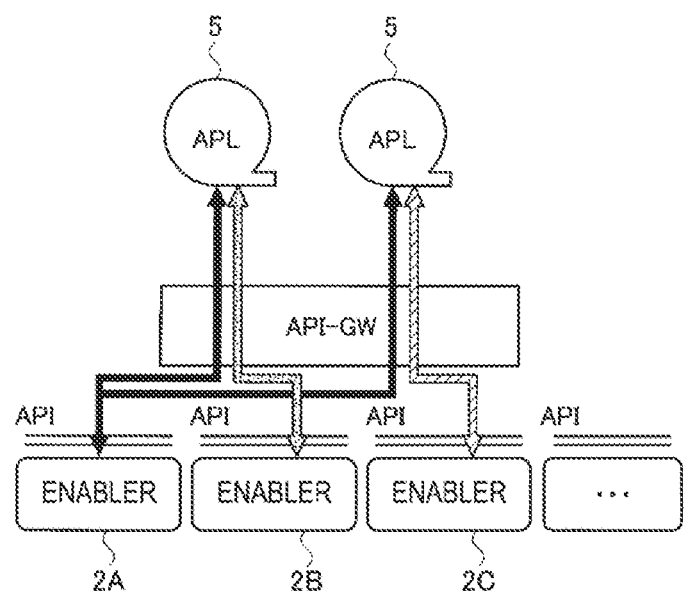
FIG. 8 is a diagram of a configuration assumed in the embodiment of the present invention.

FIGS. 7 and 8 are diagrams of configurations assumed in the embodiment of the present invention. Specifically, FIG. 7 illustrates a configuration of an API-GW and the enablers 2A, 2B, 2C, . . . , and FIG. 8 illustrates an operation of the application 5 cooperating with the enablers 2A, 2B, 2C, . . . , that are a plurality of enablers.

As described above, it is assumed that a large number of enablers 2A, 2C, . . . are connected to the API-GW and the application 5 uses and interacts with the large number of enablers 2A, 2B, 2C, . . . . It is assumed that a plurality of APIs that have similar functions and are owned by a plurality of companies are registered on the same platform if an API market, that is, an API platform and the like, where public APIs of the entire NTT Group and popular APIs of other companies are prepared are introduced in the future. The transfer control apparatus 1 according to the embodiment of the present invention is obtained by adding a function to such an API-GW.

Comparison of APIs in Identical Genre

FIG. 9 is a table showing a comparison of APIs in the identical genre. Here, three APIs, "GoogleTranslate", "YandexTranslate API", and "IBMWatsonLanguageTranslator" are compared. As shown in the table, in a case of translation, a "translation function" and a "language detection function" are common to many APIs. For example, in a case of a "translation" method, an input is a text and an output is a translation result. In a case of a "language detection" method, an input is a text and an output is a detected language. Of course, FIG. 9 is merely an example and should not be understood to limit the embodiments of the present invention.

Example 1

Figure 10:
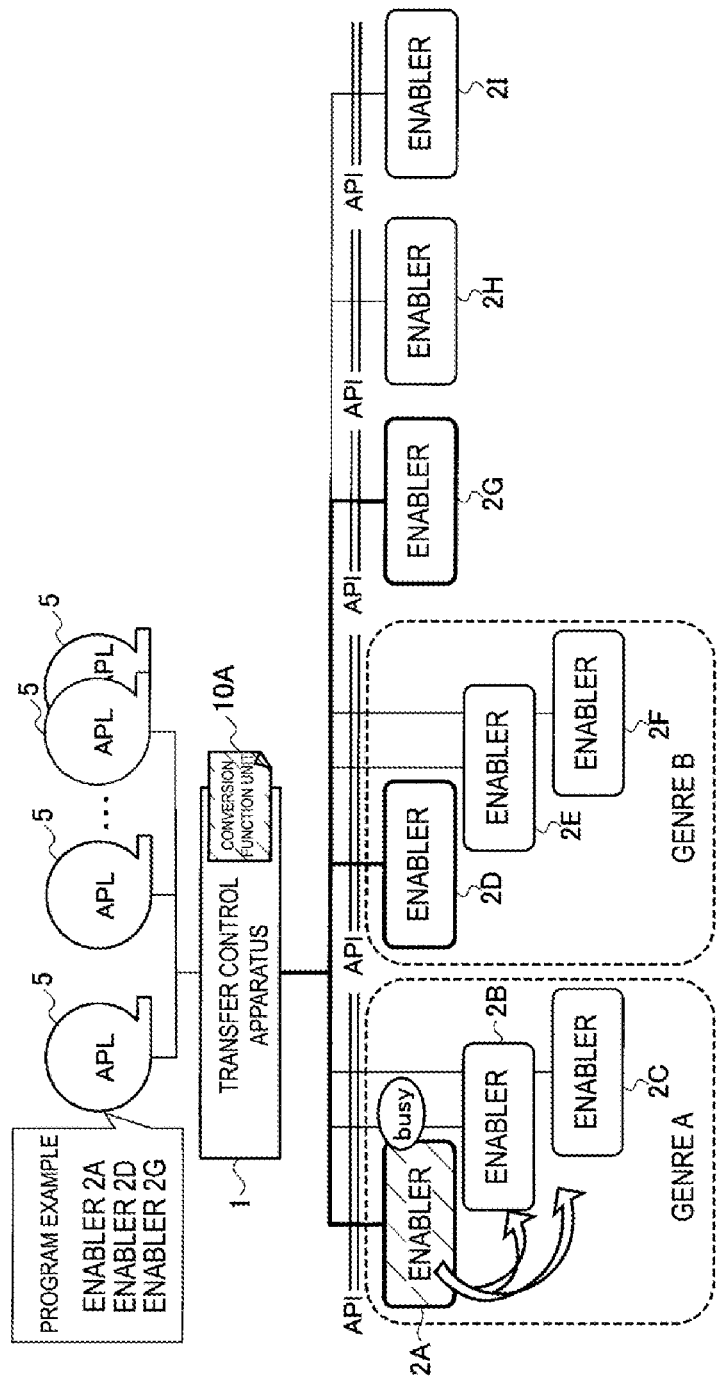
FIG. 10 is a configuration diagram illustrating configurations of a transfer control apparatus and an enabler according to Example 1.
Figure 11:
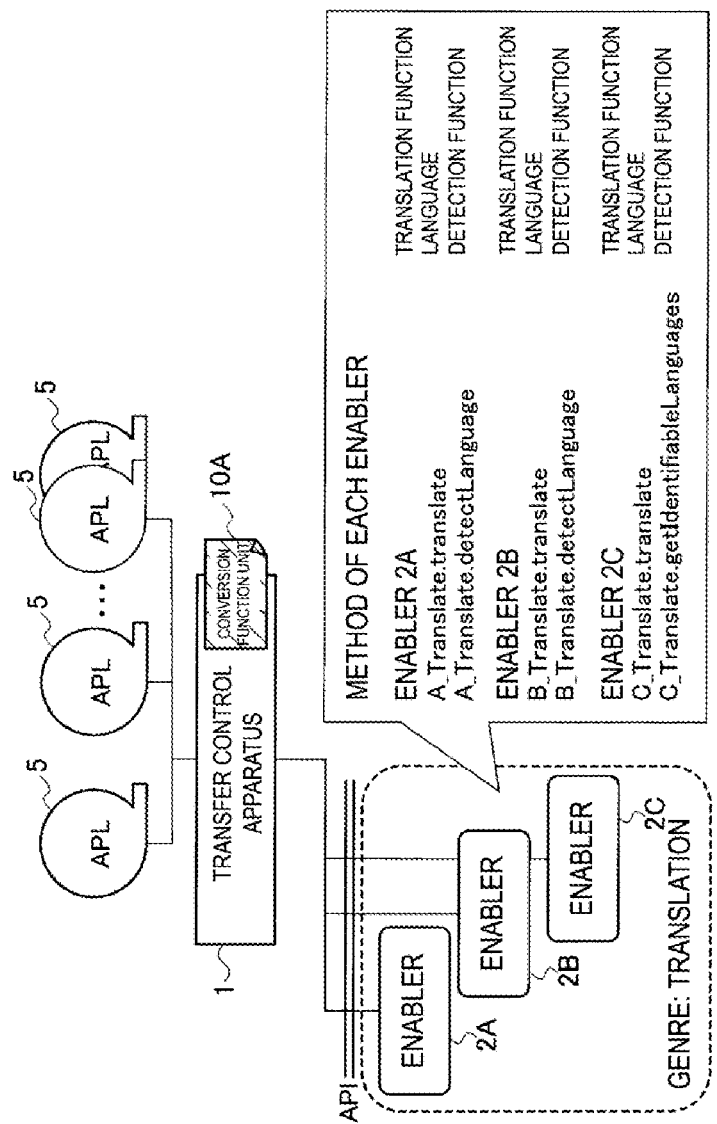
FIG. 11 is a configuration diagram illustrating configurations of the transfer control apparatus and the enabler according to Example 1.

FIGS. 10 and 11 are configuration diagrams illustrating configurations of the transfer control apparatus 1 and the enabler 2 according to Example 1. The transfer control apparatus 1 will be described more specifically below by using FIGS. 10 and 11.

In Example 1, the enablers 2 are grouped for each genre and registered under the transfer control apparatus 1. For example, a translation enabler 2A of a company A, a translation enabler 2B of a company B, . . . , which provide a similar translation service, are registered in a genre A of translation.

In an example of the application 5, the application 5 cooperating with the enablers 2A, 2D, and 2G is assumed. If such an application 5 is executed, the enablers 2A, 2D and 2G are called via the transfer control apparatus 1.

The transfer control apparatus 1 determines an execution priority of the enabler 2 in genre A, B, . . . . Here, in the genre A, it is assumed that the execution priority increases in the order of the enablers 2A, 2B, and 2C. Thus, the transfer control apparatus 1 uses the enabler 2B having a next highest execution priority if the enabler 2A is in a busy state, and uses the enabler 2C having a next highest execution priority if the enabler 2B is also in a busy state. If the application 5 uses (designates) the enabler 2B or 2C that is not in a busy state, the transfer control apparatus 1 automatically transfers a request to the enabler 2B or 2C. A conversion function unit 10A implements a method conversion when the request is transferred to another enabler. As described above, if there is no problem in a state of a priority enabler 2, the enabler 2 is called, and then, an alternative enabler 2 is called.

The conversion function unit 10A will be described below in more detail with reference to FIG. 11. As described above, when the enabler 2 is registered with the transfer control apparatus 1, a method of a function common to APIs in an identical genre is set as a target API to be converted, and when the request is transferred to the alternative enabler 2 by the transfer control apparatus 1, the conversion function unit 10A converts the method. In FIG. 11, a case of the genre "translation" is illustrated. The conversion function unit 10A defines a target method to be converted of the genre "translation" of the enabler 2 in the transfer control apparatus 1 as illustrated in FIG. 11, and mutually converts the target method to be converted into the methods of the enablers 2A, 2B, and 2C at the time of a request from the application 5 and transfers the request. The conversion function unit 10A directly transfers (without converting the method) the request to the enabler 2 if the request is a request for a method of a function not in common.

As described above, according to the transfer control apparatus 1 based on Example 1, it is possible to allocate the request to the alternative enabler 2 without modifying the application 5 to improve the availability. Note that the transfer control apparatus 1 according to Example 1 may include the following functions.

Monitor a load status, a response time (turnaround time), and a status of occurrence of an error in the enabler 2 to which the genre is set.

If there is an available enabler 2 in the identical genre, the transfer control apparatus 1 allocates processing to the available enabler 2 (in which the allocation can be designated on a program of the application 5).

If it is not desired to allocate processing to the alternative enabler 2, the allocation may not be executed if a user designates so on the application 5.

The transfer control apparatus 1 recommends that the application 5 allocates processing to an alternative enabler 2, and then, allocates the processing.

Example 2

Figure 12:
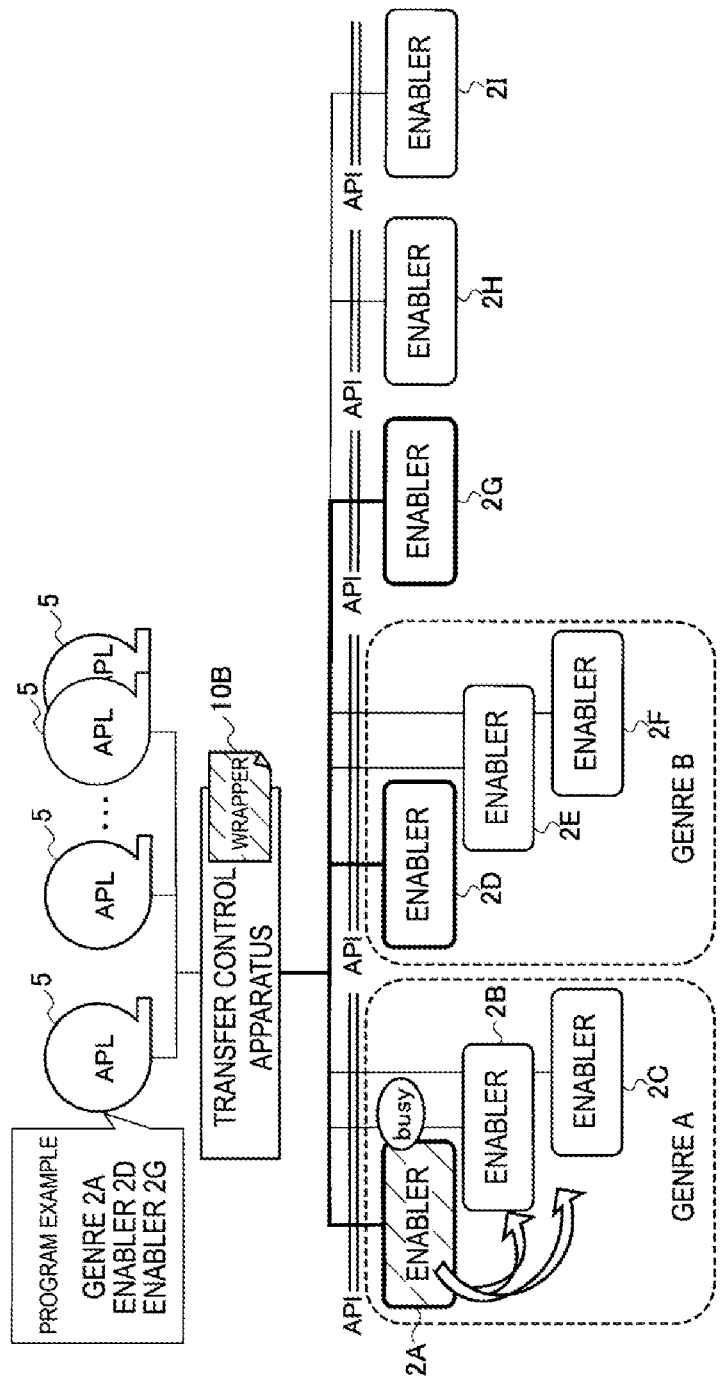
FIG. 12 is a configuration diagram illustrating configurations of a transfer control apparatus and an enabler according to Example 2.
Figure 13:
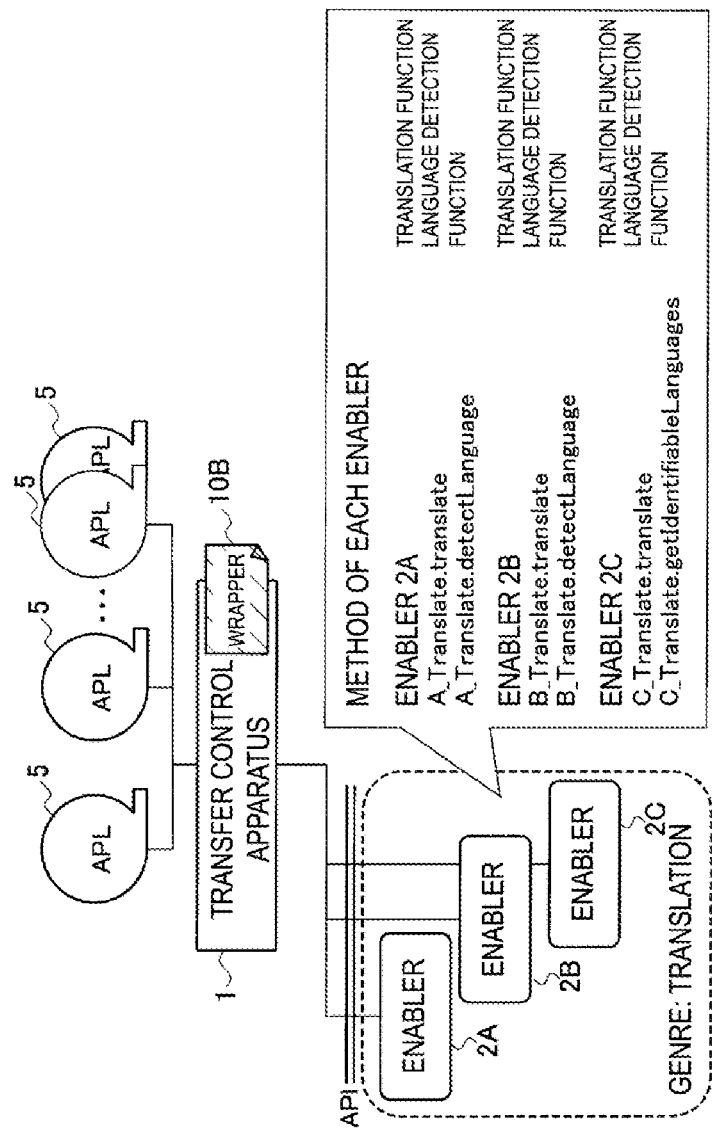
FIG. 13 is a configuration diagram illustrating configurations of the transfer control apparatus and the enabler according to Example 2.

FIGS. 12 and 13 are configuration diagrams illustrating configurations of the transfer control apparatus 1 and the enabler 2 according to Example 2. In Example 2, the transfer control apparatus 1 includes a common interface. The transfer control apparatus 1 according to Example 2 will be described below with a focus on a difference from Example 1.

The transfer control apparatus 1 is capable of allocating processing even if the transfer control apparatus 1 includes a common interface for each genre. Specifically, the transfer control apparatus 1 sets, as a genre calling API, a method of a function common to APIs in an identical genre when the enabler 2 is registered. A wrapper 10B that converts a method at each calling is created and arranged in the transfer control apparatus 1. When the application 5 calls a genre, the application 5 sends a request by using the method of the common interface prepared by the transfer control apparatus 1.

In Example 2, the case of the genre "translation" is also illustrated. The transfer control apparatus 1 defines the method of the genre "translation" of the enabler 2 as illustrated in FIG. 13. Upon receiving a request using the common interface from the application 5, the wrapper 10B converts the request into each of the methods of the enablers 2A, 2B, and 2C illustrated in FIG. 13 and transfers the request.

API-GW_Translate. Translate Translation Function

API-GW_Translate. DetectLanguages Language Detection Function

In an example of the application 5, the application 5 cooperating with the genre A of the enabler 2 (the enabler 2A is designated) and the enablers 2D and 2G is assumed. If such an application 5 is executed, the transfer control apparatus 1 imparts the execution priority to the enabler 2 selected from the genre A. If there is no problem in a state of the priority enabler 2 (here, the enabler 2A), the transfer control apparatus 1 calls the enabler 2 and then, calls the subsequent enablers 2D and 2G.

In the illustrated example, the wrapper 10B preferentially uses the enabler 2A in the genre A. If the enabler 2A is in a busy state, the alternative enablers 2B and 2C are used. The wrapper 10B converts a request of the common interface transmitted from the application 5 into the individual method of the enabler 2 to be used. Although the enabler 2A is the priority enabler 2, the enabler 2 may be individually designated on the application 5 side. When the enabler 2 is individually designated, the transfer control apparatus 1 does not use the wrapper 10B.

As described above, according to the transfer control apparatus 1 according to Example 2, the enabler 2 can not only be individually called from the application 5 but the genre can also be called. Further, there is less combination of method conversions as compared with Example 1 to provide an effect of reducing an operation cost for a provider of the transfer control apparatus 1.

Conclusion

As described above, the transfer control apparatus 1 according to the embodiment of the present invention is an apparatus for dynamically switching the enablers 2, and includes the registration unit 11 that registers a plurality of enablers 2 having a similar function, in an identical genre, the monitoring unit 12 that monitors a state of the enablers 2, and the transfer control unit 13 that transfers a request to an alternative enabler 2 registered in a genre identical to each of the enablers 2 to switch a request destination if the enabler 2 is in a predetermined busy state upon calling the enabler 2. This enables the application 5 to operate normally without a need of update even if the enabler 2 does not operate normally, a service of the enabler 2 is abruptly suspended, or the specification of the enabler 2 changes, and thus, it is possible to improve the availability of the application 5.

Also, the transfer control apparatus 1 may set a method of a function common to APIs in an identical genre to the target API to be converted when the enabler 2 is registered, and convert the method when transferring a request to the alternative enabler 2. That is, processing of converting parameter information of a function common to the enablers 2 in the identical genre is performed at the transfer control apparatus 1 side, and thus, there is no need of changes at the application 5 side even if the specification of each of the enablers 2 is changed.

Further, a method of a function common to APIs in an identical genre may be set as a genre calling API when the enabler 2 is registered, and the wrapper 10B may convert a method at each calling. As a result, it is not only possible to individually call the enabler 2 from the application 5 but also possible to call the genre.

Note that the present invention can be realized not only as such a transfer control apparatus 1 but also realized as a transfer control method including, as steps, characteristic functional units provided in such a transfer control apparatus 1, and implemented as a transfer control program causing a computer to execute these steps. Needless to say, such a program can be distributed via a recording medium such as a CD-ROM or a transmission medium such as the Internet.

Other Embodiments

Although the embodiment of the present invention has been described above, it should not be understood that description and drawings that are parts of the disclosure are not intended to limit the present invention. Various alternative embodiments, examples, and running techniques will become apparent from the disclosure for those skilled in the art.

For example, the transfer control apparatus 1 described in the embodiment of the present invention may be configured on a single piece of hardware as illustrated in FIG. 5 or may be configured on a plurality of pieces of hardware in accordance with functions and the number of processes thereof. The transfer control apparatus 1 may be implemented on a known service providing system 9.

Embodiment Using Plurality of Transfer Control Apparatuses

An embodiment using a plurality of transfer control apparatuses will be described below. In the above-described Example 1, if a certain enabler 2 is in a busy state, the transfer control apparatus 1 transfers a request to an enabler 2 in the identical genre having a function similar to that of the certain enabler 2. In this case, the transfer control apparatus 1 monitors, for all requests transmitted from the application 5, the enablers 2 called by the requests. Thus, the transfer control apparatus 1 may not scale if there are many requests. That is, the transfer control apparatus 1 may not be able to satisfy a predetermined performance as the number of requests increases.

If a plurality of transfer control apparatuses 1 are prepared and a load distribution device evenly allocates requests from the application 5 to the plurality of transfer control apparatuses 1, the load distribution device may allocate requests even from the same user to a different transfer control apparatus 1 at each request. In this case, the transfer control apparatuses 1 cannot inherit information indicating to which enabler 2 a previous request of the user was previously transferred, and thus, a user convenience is deteriorated.

In the present embodiment, in order to avoid deterioration in user convenience, when a load distributed among the plurality of transfer control apparatuses 1, an allocation destination for each user is uniquely specified. Specifically, if the transfer control apparatus that is an allocation destination is uniquely specified based on a hash value of a user ID, every request from the same user ID is allocated to the same transfer control apparatus 1. As a result, in the present embodiment, the transfer control apparatuses 1 are capable of inheriting a transfer status (transfer history) of the enablers 2 to avoid deterioration in user convenience when load is distributed among the plurality of transfer control apparatuses 1.

Further, in the present embodiment, in order to achieve an even load distribution for the plurality of transfer control apparatuses 1, the load is distributed by using a Consistent Hash method.

Figure 14:
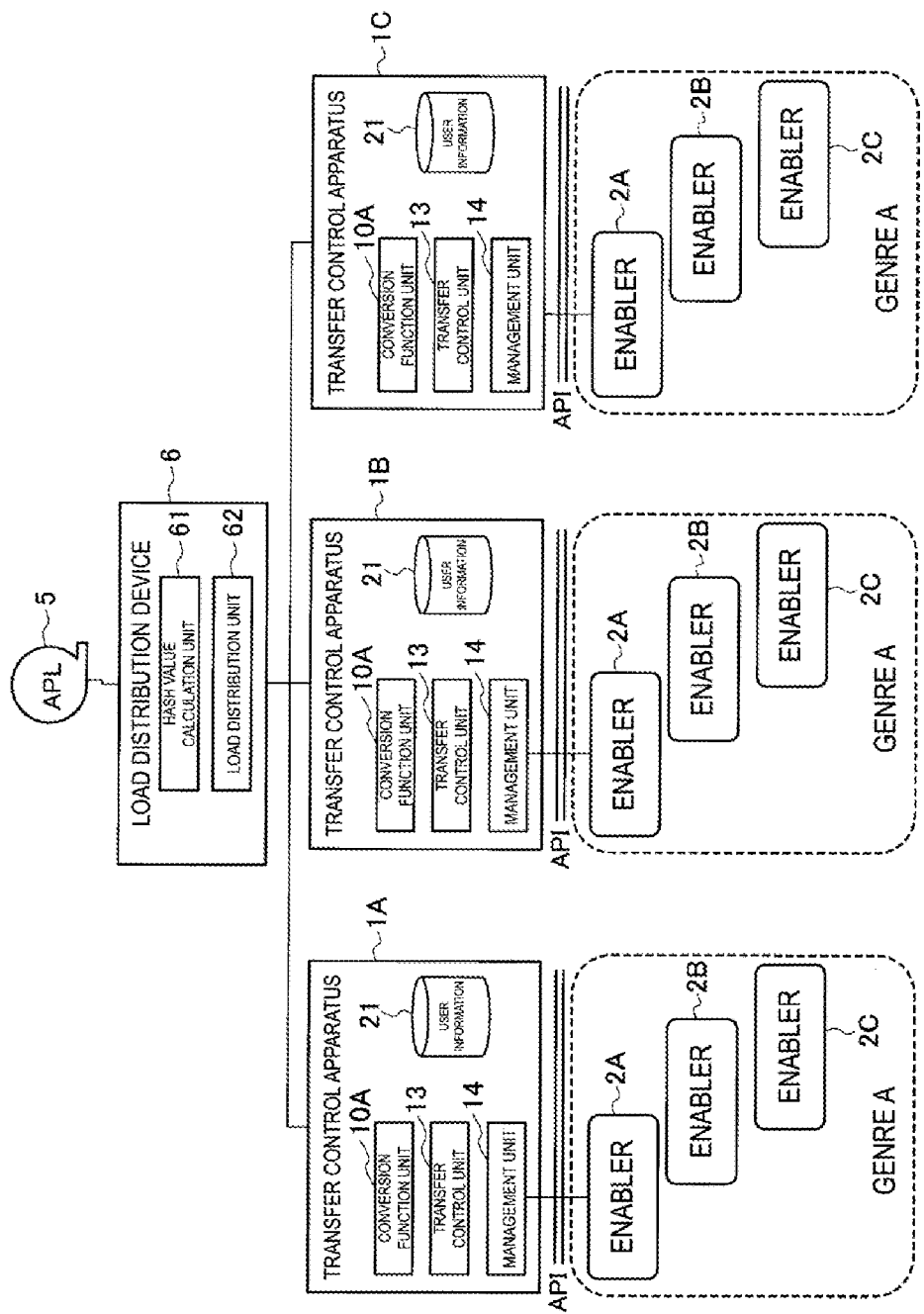
FIG. 14 is a diagram illustrating a configuration of a service providing system in an embodiment using a plurality of transfer control apparatuses.

FIG. 14 is a diagram illustrating an example of a service providing system of the present embodiment. The illustrated service providing system includes a load distribution device 6, a plurality of transfer control apparatuses 1A, 1B, and 1C, and the enablers 2A, 2B, and 2C that provide a component used in the application 5. The enablers 2A, 2B and 2C are connected to the transfer control apparatuses 1A, 1B, and 1C. If the transfer control apparatuses 1A, 1B, and 1C are not distinguished, the transfer control apparatuses 1A, 1B, and 1C may be simply described as "transfer control apparatus 1". If the enablers 2A, 2B, and 2C are not distinguished, the enablers 2A, 2B, and 2C may be simply described as "enabler 2". Note that the enabler 2 and the application 5 of the present embodiment are similar to those of the above-described embodiment.

The load distribution device 6 allocates a request transmitted from the application 5 to the plurality of transfer control apparatuses 1 for load distribution. The illustrated load distribution device 6 includes a hash value calculation unit 61 and a load distribution unit 62. The hash value calculation unit 61 calculates a hash value of a user ID included in a request transmitted from the application 5. The load distribution unit 62 uses the hash value to determine the transfer control apparatus 1 to which the request is allocated. Further, the load distribution unit 62 reassigns a hash table by using the Consistent Hash method when a new transfer control apparatus 1 is added or the transfer control apparatus 1 is removed.

The transfer control apparatus 1 of the present embodiment includes the conversion function unit 10A, the transfer control unit 13, a management unit 14, and a user information storage unit 21. Although not illustrated, the transfer control apparatus 1 also includes the registration unit 11, the monitoring unit 12, the storage device 20, and the communication control device 30 illustrated in FIG. 5. The conversion function unit 10A is configured in much the same way as Example 1 described above. The transfer control apparatus 1 may further include the wrapper 10B in Example 2, or may include the wrapper 10B instead of the conversion function unit 10A.

The transfer control unit 13 transfers the request to an alternative enabler registered in the identical genre to the genre of the enabler 2 to switch the request destination if the enabler 2 is in a predetermined busy state upon calling the enabler 2. Further, the transfer control unit 13 reads a transfer destination enabler corresponding to the user ID included in the request from the user information storage unit 21, and determines an enabler to which the request is transferred, based on the transfer destination enabler.

If the hash table is reassigned as a result of an addition of the transfer control apparatus 1, the management unit 14 distributes a part of user information of the management unit 14 to the newly added transfer control apparatus 1 according to the reassigned hash table. If the hash table is reassigned as a result of the removal of the transfer control apparatus 1, the management unit 14 stores, as the user information of the management unit 14, at least a part of the user information of the removed transfer control apparatus 1 according to the reassigned hash table, into the user information storage unit 21.

The user information storage unit 21 stores, for each user ID, the transfer destination enabler (information on the transfer destination enabler) to which the request is transferred. Specifically, the user information storage unit 21 stores, as the user information, history information indicating to which enabler 2 a request is actually transferred for an enabler 2 designated by the request, for each user ID. The user information includes, for example, the user ID, the enabler designated in the request, and the transfer destination enabler. The user information storage unit 21 is provided in the storage device 20.

Figure 15:
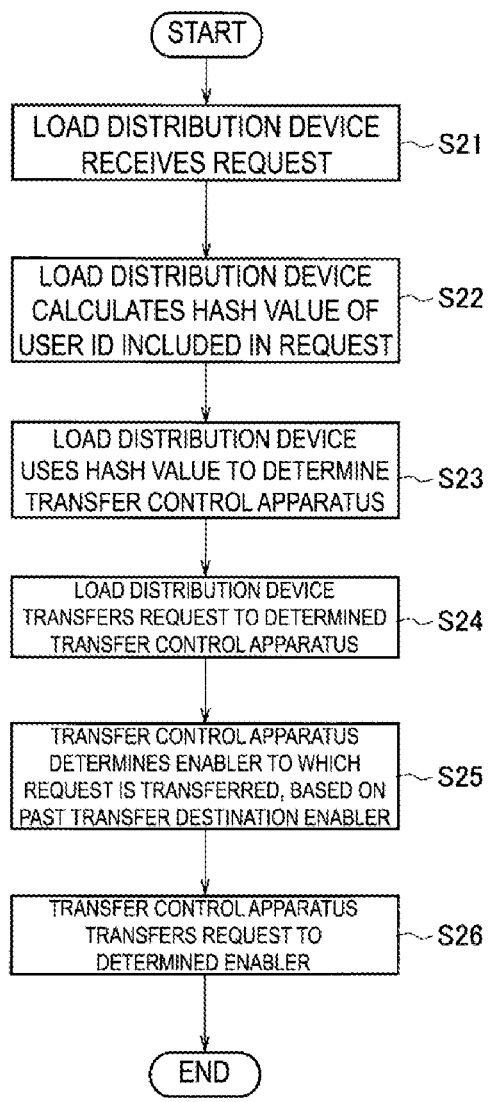
FIG. 15 is a flowchart in the embodiment using a plurality of transfer control apparatuses.

FIG. 15 is a flowchart illustrating a load distributing process performed by the load distribution device 6 and the transfer control apparatus 1. The hash value calculation unit 61 of the load distribution device 6 receives a request transmitted from the application 5 (S21) and calculates a hash value of a user ID included in the request (S22).

The load distribution unit 62 uses the hash value to determine the transfer control apparatus 1 to which the request is allocated (S23), and sends the request to the determined transfer control apparatus 1 (S24). In the present embodiment, the load distribution unit 62 uses the Consistent Hash method to determine the transfer control apparatus 1 to which the request is allocated.

Figure 16:
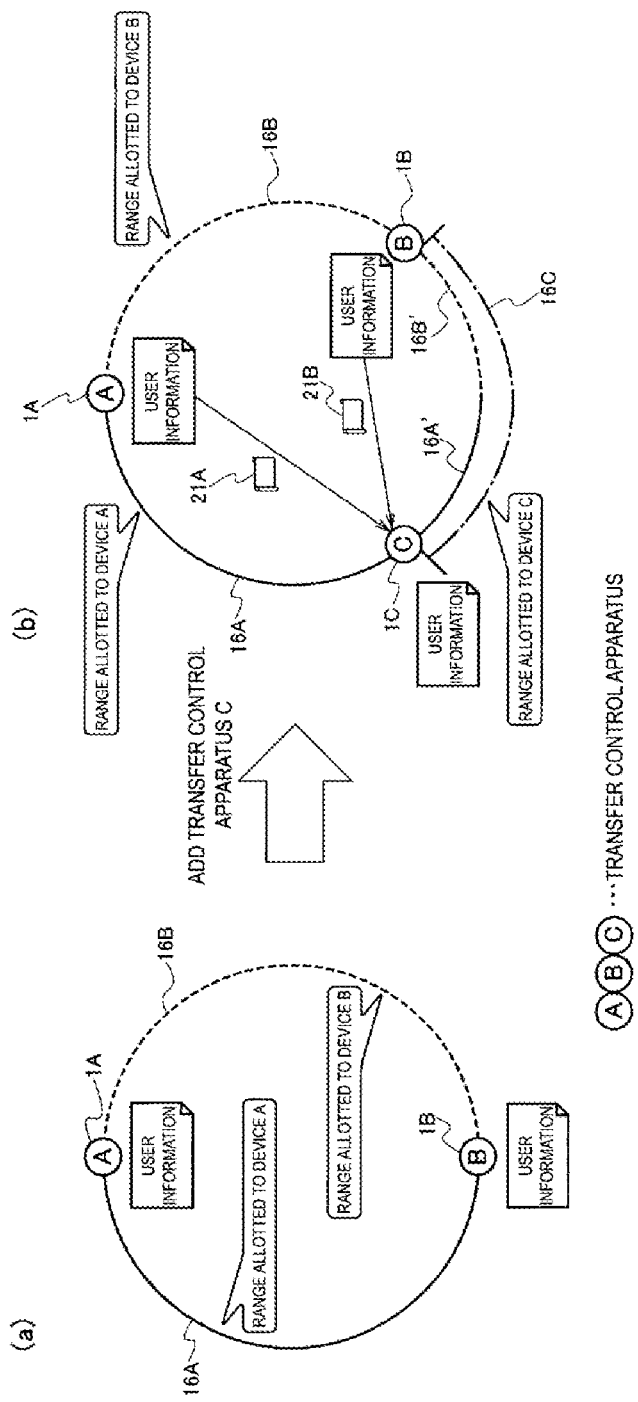
FIG. 16 is a diagram illustrating an outline of a Consistent Hash method.

FIG. 16 is a diagram briefly illustrating an overview of the Consistent Hash method. In the Consistent Hash method employed in the present embodiment, the load distribution unit 62 calculates a hash value of a user ID in advance by using a hash function, and arranges the resultant hash value in a virtual circular (ring-shaped) hash table (Hash space). Then, when receiving a request of a certain user ID to select the transfer control apparatus 1 of the user ID, the load distribution unit 62 similarly calculates a hash value of the user ID by using the hash function, and selects the transfer control apparatus 1 allotted at a position of the hash table corresponding to the hash value.

FIG. 16(a) illustrates a hash table obtained when the two transfer control apparatuses 1A and 1B are connected to the load distribution device 6. A solid line portion 16A of a circle (hash table) is a range allotted to the transfer control apparatus 1A. That is, the load distribution unit 62 allocates a request from a user ID corresponding to a hash value in the solid line portion 16A, to the transfer control apparatus 1A. A dotted line portion 16B of the circle is a range allotted to the transfer control apparatus 1B. That is, the load distribution unit 62 allocates a request from a user ID corresponding to a hash value in the dotted line portion 16A, to the transfer control apparatus 1B. Not that the user information of a user ID in the range 16A allotted to the transfer control apparatus 1A is stored in the user information storage unit 21 of the transfer control apparatus 1A. The user information of a user ID in the range 16B allotted to the transfer control apparatus 1B is stored in the user information storage unit 21 of the transfer control apparatus 1B.

Upon receiving a request from the load distribution device 6, the transfer control unit 13 of the transfer control apparatus 1 reads a transfer destination enabler corresponding to the user ID included in the request from the user information storage unit 21, and determines an enabler 2 to which the request is transferred based on the transfer destination enabler (S25). The transfer control unit 13 sends the request to the determined enabler 2 (S26). For example, the transfer control unit 13 uses the user information indicating to which enabler 2 a request is transferred in the past (previous time and the like) for the enabler 2 designated in the request to determine, in S25, an enabler 2 to which the request is to be transferred so that the enabler 2 is the same as the enabler 2 to which the previous request was transferred. At this time, the transfer control unit 13 stores the enabler designated in the request and the transfer destination enabler to which the request is actually transferred, in the user information storage unit 21 in association with the user ID. The transfer control apparatus 1 performs the method conversion described in Examples 1 and 2 as needed when the request is transferred.

Next, a case where the transfer control apparatus 1 is added will be described with reference to FIG. 16. Here, a case where as illustrated in FIG. 16(a), the transfer control apparatus 1C is added to the two transfer control apparatuses 1A and 1B as illustrated in FIG. 16(b) will be described as an example. FIG. 16(b) illustrates a circular hash table obtained when the three transfer control apparatuses 1A, 1B, and 1C are connected to the load distribution device 6. The solid line portion 16A of the circle is a range allotted to the transfer control apparatus 1A before the transfer control apparatus 1C is added. The dotted line portion 16B of the circle is a range allotted to the transfer control apparatus 1B before the transfer control apparatus 1C is added.

The load distribution unit 62 of the load distribution device 6 reassigns a hash table by using the Consistent Hash method when the new transfer control apparatus 1C is added. As a result, an alternate long and short dash line portion 16C of the circle is a range allotted to the added transfer control apparatus 1C. That is, a part 16A' of the range (solid line portion 16A) allotted to the transfer control apparatus 1A and a part 16B' of the range (dotted line portion 16B) allotted to the transfer control apparatus 1B are the range allotted to the transfer control apparatus 1C.

If the hash table is thus reassigned as a result of adding the transfer control apparatus 1C, the management units 14 of the transfer control apparatuses 1A and 1B distribute a part of the user information of the management units 14 to the added transfer control apparatus 1C according to the reassigned hash table. Here, the transfer control apparatus 1A transmits user information 21A of user IDs corresponding to the hash value in the part 16A' to the transfer control apparatus 1C. The transfer control apparatus 1B transmits user information 21B of user IDs corresponding to the hash value in the part 16B' to the transfer control apparatus 1C.

The user information may be distributed in response to an operator's instruction, or may be distributed by the following method: a cluster is configured among the transfer control apparatuses 1 all of which hold the hash table, and if a new transfer control apparatus 1 is added, user information to be allotted to the new transfer control apparatus 1 is autonomously distributed by each of the transfer control apparatuses 1.

A case where the transfer control apparatus 1 is removed is in much the same way as the above-described case where the transfer control apparatus 1 is added. That is, when the transfer control apparatus 1C is removed as illustrated in FIG. 16(a) from the three transfer control apparatuses 1A, 1B, and 1C as illustrated in FIG. 16(b), the load distribution device 6 reassigns the hash table by using the Consistent Hash method. As a result, the range allotted to the transfer control apparatus 1C is eliminated, and hence, a state illustrated in FIG. 16(a) is obtained. In this case, the management unit 14 of the transfer control apparatuses 1A and B stores, as the user information of the management unit 14, at least a part of the user information in the range 16C allotted to the removed transfer control apparatus 1C, into the user information storage unit 21, according to the reassigned hash table.

Figure 17:
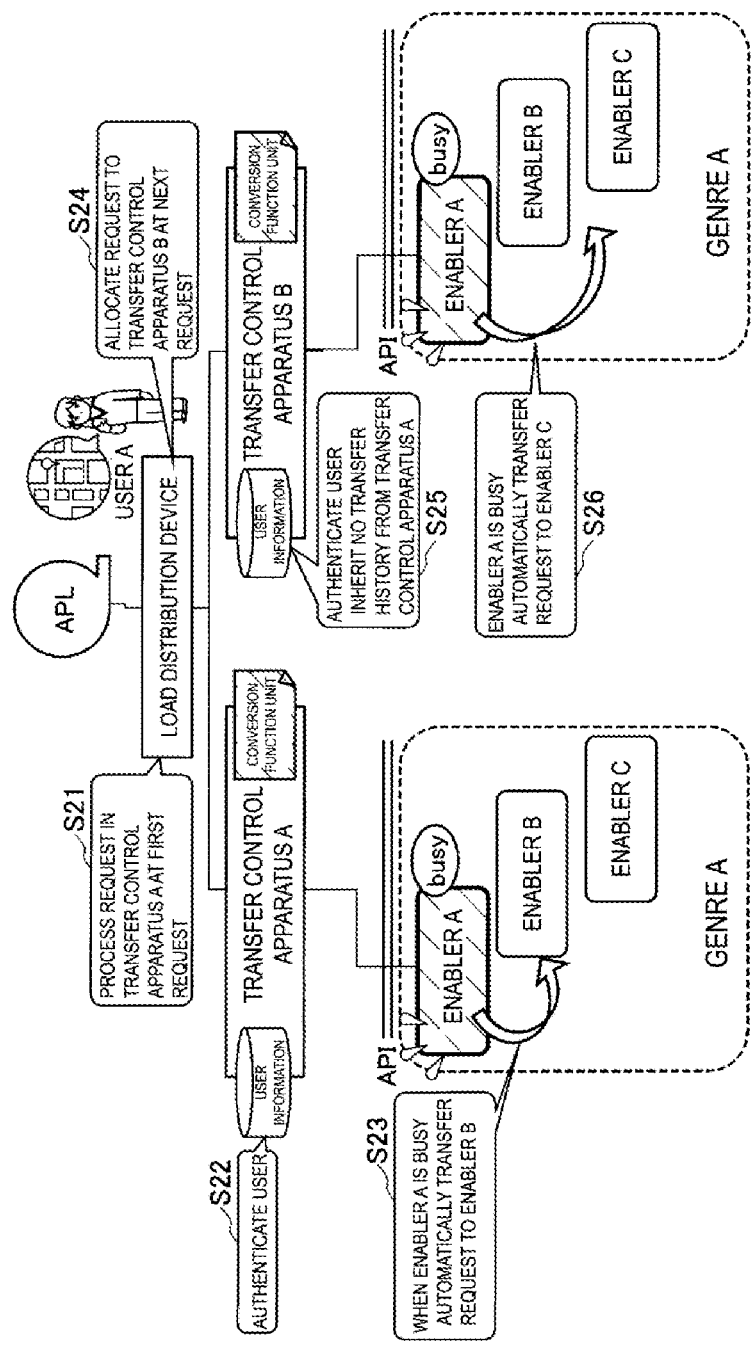
FIG. 17 is a diagram illustrating a process of Comparative Example.

FIG. 17 is a diagram for explaining a load distribution in Comparative Example of the present embodiment. In Comparative Example, a load distribution device evenly allocates a request from an application to a plurality of transfer control apparatuses. The load distribution device allocates a first request of a user A transmitted from an application to a transfer control apparatus A (S21). The transfer control apparatus A acquires the user information of the user A (S22). Here, the request is the first request of the user A, and thus, the transfer control apparatus A does not hold the user information indicating to which enabler the request of the user A was transferred. The transfer control apparatus A transfers the request to an alternative enabler 2 because the enabler A designated in the request is in a busy state (S23). In this case, the transfer control apparatus 1A sets, to the user information, the enabler B to which the request is actually transferred as a transfer destination enabler 2.

The load distribution device allocates a next request of the user A to a transfer control apparatus B (S24). The transfer control apparatus B acquires the user information of the user A (S25). The first request of the user A is processed by the transfer control apparatus A, and thus, the transfer control apparatus B does not hold the user information indicating to which enabler the first request of the user A was transferred. The transfer control apparatus B transfers the request to an alternative enabler C because the enabler A designated by the application is in a busy state (S26).

In Comparative Example, the user A initially uses the enabler B, but in the next request, the user A uses the enabler C. For example, if an enabler in the genre A is a map display, a map according to a specification of the enabler B is displayed in the first request, but a map according to a specification of the enabler C is displayed in the next request. Enablers have a map design, shop name displayed on the map, and the like, which are different from each other, and thus, if an enabler to be used is changed at each request, a map different in design is displayed in a terminal of the user A at each request, which deteriorates a user convenience.

On the other hand, in the present embodiment, even if load is distributed by using a plurality of transfer control apparatuses 1 due to an increase in users and requests, a transfer control apparatus to which a request is allocated is determined by using a hash value of a user ID. Thus, in the present embodiment, a request from the same user ID can be allocated to the same transfer control apparatus 1. Thus, in the present embodiment, the transfer control apparatus 1 is capable of inheriting the transfer status (transfer history) of the enabler 2, and thus, it is possible to avoid deterioration in user convenience when the load is distributed among a plurality of transfer control apparatuses 1.

In the present embodiment, load is distributed by using the Consistent Hash method. As a result, in the present embodiment, it is possible to realize even load distribution among the plurality of transfer control apparatuses 1.

It is a matter of course that various embodiments and the like that are not described herein are also included in the present invention. Thus, the technical scope of the present disclosure is defined only by the present disclosure specifying matters according to the claims that are appropriate from the above description.

REFERENCE SIGNS LIST

1 . . . Transfer control apparatus (service providing server)
2 . . . Enabler (component providing server)
5 . . . Application
10 . . . Processing device
10A . . . Conversion function unit
10B . . . Wrapper
11 . . . Registration unit
12 . . . Monitoring unit
13 . . . Transfer control unit
14 . . . Management unit
20 . . . Storage device
21 . . . User information storage unit
30 . . . Communication control device

The invention claimed is:

1. A transfer control apparatus for dynamically switching enablers, comprising:
one or more computers; and
one or more storage devices coupled with the one or more computers and storing instructions that, when executed by the one or more computers, cause the one or more computers to perform operations comprising:
registering a plurality of first enablers in a first genre and a plurality of second enablers in a second genre, wherein each first enabler of the plurality of first enablers has a first function, and each second enabler of the plurality of second enablers has a second function that differs from the first function;
determining an execution priority of the plurality of first enablers in the first genre and the plurality of second enablers in the second genre;
setting, based on the execution priority, a default enabler for the first genre and the second genre;
monitoring states of the plurality of first enablers and the plurality of second enablers;
receiving a request for a result of a function;
transmitting the request to the default enabler;
in response to transmitting the request to the default enabler, receiving an error from the default enabler;
in response to receiving the error from the default enabler, determining the default enabler is in a predetermined busy state; and
in response to determining the default enabler is in the predetermined busy state, transferring the request to a first alternative enabler and a second alternative enabler registered in at least one of the first genre or the second genre to switch a request destination, wherein the first alternative enabler and the second alternative enabler each have a next highest execution priority after the default enabler.

2. The transfer control apparatus according to claim 1, wherein the operations comprise setting, as a target application programming interface (API) to be converted, a method of a function common to APIs in at least one of the first genre or the second genre when the default enabler in the same genre is registered, and converting the method when the request is transferred to the first alternative enabler and the second alternative enabler in the same genre.

3. The transfer control apparatus according to claim 1, wherein the operations comprise setting, as a genre calling application programming interface (API), a method of a function common to APIs in at least one of the first genre or the second genre when the default enabler in the same genre is registered, and converting the method at each calling.

4. The transfer control apparatus according to claim 1, in response to transferring the request to the first alternative enabler and the second alternative enabler, receiving, from each of the first alternative enabler and the second alternative enabler, the result of the function.

5. The transfer control apparatus according to claim 4, wherein the request comprises a text to be translated in a particular language and the result of the function comprises a translation of the text in the particular language.

6. The transfer control apparatus according to claim 4, wherein the request comprises a text written in a particular language and the result of the function comprises a detection of the particular language of the written text.

7. A service providing system comprising a load distribution device and a plurality of transfer control apparatuses, each transfer control apparatus comprising:
one or more computers; and
one or more storage devices coupled with the one or more computers and storing instructions that, when executed by the one or more computers, cause the one or more computers to perform operations comprising:
registering a plurality of first enablers in a first genre and a plurality of second enablers in a second genre, wherein each first enabler of the plurality of first enablers has a first function, and each second enabler of the plurality of second enablers has a second function that differs from the first function;
determining an execution priority of the plurality of first enablers in the first genre and the plurality of second enablers in the second genre;

setting, based on the execution priority, a default enabler for the first genre and the second genre;

monitoring states of the plurality of first enablers and the plurality of second enablers;

receiving a request for a result of a function;

transmitting the request to the default enabler;

in response to transmitting the request to the default enabler, receiving an error from the default enabler;

in response to receiving the error from the default enabler, determining the default enabler is in a predetermined busy state; and in response to determining the default enabler is in the predetermined busy state, transferring the request to a first alternative enabler and a second alternative enabler registered in at least one of the first genre or the second genre to switch a request destination, wherein the first alternative enabler and the second alternative enabler each have a next highest execution priority after the default enabler; and the load distribution device comprising:

one or more computers; and one or more storage devices coupled with the one or more computers and storing instructions that, when executed by the one or more computers, cause the one or more computers to perform operations comprising:

calculating a hash value of a user identifier (ID) included in the request; and determining an allocation destination of the request by using the hash value of the user ID; and wherein the operations of the transfer control apparatus further comprise:

storing a transfer destination enabler to which the request is transferred, for each user ID;

reading, from the one or more storage devices of the transfer control apparatus, the transfer destination enabler corresponding to the user ID included in the request; and determining an enabler to which the request is transferred based on the transfer destination enabler.

8. The service providing system according to claim 7, wherein the operations of the load distribution device further comprise reassigning a hash table by using a Consistent Hash method when a new transfer control apparatus is added, and wherein the operations of the transfer control apparatus further comprise distributing a part of user information of the transfer control apparatus to the new transfer control apparatus, according to the reassigned hash table.

9. The service providing system according to claim 7, wherein the operations of the load distribution device further comprise reassigning a hash table by using a Consistent Hash method when the transfer control apparatus is removed, and wherein the operations of the transfer control apparatus further comprise storing, as user information of the transfer control apparatus, at least a part of user information of the removed transfer control apparatus, into the one or more storage devices of the transfer control apparatus, according to the reassigned hash table.

10. A transfer control method for dynamically switching enablers using a computer to execute the method comprising:

registering a plurality of first enablers in a first genre and a plurality of second enablers in a second genre, wherein each first enabler of the plurality of first enablers has a first function, and each second enabler of the plurality of second enablers has a second function that differs from the first function;

determining an execution priority of the plurality of first enablers in the first genre and the plurality of second enablers in the second genre;

setting, based on the execution priority, a default enabler for the first genre and the second genre;

monitoring states of the plurality of first enablers and the plurality of second enablers;

receiving a request for a result of a function;

transmitting the request to the default enabler;

in response to transmitting the request to the default enabler, receiving an error from the default enabler;

in response to receiving the error from the default enabler, determining the default enabler is in a predetermined busy state; and in response to determining the default enabler is in the predetermined busy state, transferring the request to a first alternative enabler and a second alternative enabler registered in at least one of the first genre or the second genre to switch a request destination, wherein the first alternative enabler and the second alternative enabler each have a next highest execution priority after the default enabler.

11. A non-transitory computer readable medium comprising a transfer control program which, when executed by a computer, causes the computer to perform operations, comprising:

registering a plurality of first enablers in a first genre and a plurality of second enablers in a second genre, wherein each first enabler of the plurality of first enablers has a first function, and each second enabler of the plurality of second enablers has a second function that differs from the first function;

determining an execution priority of the plurality of first enablers in the first genre and the plurality of second enablers in the second genre;

setting, based on the execution priority, a default enabler for the first genre and the second genre;

monitoring states of the plurality of first enablers and the plurality of second enablers;

receiving a request for a result of a function;

transmitting the request to the default enabler;

in response to transmitting the request to the default enabler, receiving an error from the default enabler;

in response to receiving the error from the default enabler, determining the default enabler is in a predetermined busy state; and in response to determining the default enabler is in the predetermined busy state, transferring the request to a first alternative enabler and a second alternative enabler registered in at least one of the first genre or the second genre to switch a request destination, wherein the first alternative enabler and the second alternative enabler each have a next highest execution priority after the default enabler.

* * * * *